Aug. 3, 1965   HEINZ-DIETER JANZEN   3,198,302
ELECTROMAGNETIC CLUTCH AND BRAKE WITH
RESILIENT TRANSMITTING MEANS
Filed April 1, 1963

INVENTOR:
HEINZ DIETER JANZEN
BY MICHAEL S. STRIKER
his ATTORNEY

United States Patent Office 3,198,302
Patented Aug. 3, 1965

3,198,302
ELECTROMAGNETIC CLUTCH AND BRAKE WITH RESILIENT TRANSMITTING MEANS
Heinz-Dieter Janzen, Wilhelmshaven, Germany, assignor to Olympia Werke AG, Wilhelmshaven, Germany
Filed Apr. 1, 1963, Ser. No. 269,360
Claims priority, application Germany, Apr. 4, 1962, O 8,668
10 Claims. (Cl. 192—18)

The present invention relates to clutches in general, and more particularly to an improved axial clutch. Still more particularly, the invention relates to an improved motion transmitting arrangement and to an improved braking device for the driven shaft of an axial clutch.

In many types of clutches which are combined with electromagnetic brakes, the current-consuming parts of the brake rotate with the driven shaft or with the driving shaft. Therefore, such brakes must be provided with slip rings which deliver electric current to the coil of the electromagnet. Slip rings are subjected to considerable wear and complicate the brakes. Furthermore, revolving parts of the brake add to the inertia of the driving or driven shaft which is undesirable in many types of clutches, particularly when it becomes necessary to bring one of the shafts to a rapid halt, and also in very small clutches in which the rotary parts of the brake add considerably to the overall dimensions of the unit.

In certain types of clutches in which the driven shaft is disconnected from the driving shaft by means of conventional shifter levers and shifter collars, all mechanical parts of such shifting devices must be machined with great precision and add considerably to the bulkiness of the clutch.

As a rule, the coupling disk which alternatively establishes or terminates the connection between the driving shaft and the driven shaft is rigidly secured to the driven shaft or is permitted to perform only axial movements with respect thereto. Consequently, the driving shaft and/or the driven shaft may be subjected to sudden stresses of considerable magnitude whenever the coupling disk moves into or out of motion transmitting engagement with the driving shaft. Sudden stresses might damage the machine or machines which receive motion from the driven shaft, and such stresses are equally harmful to the motor which rotates the driving shaft. In addition, rapid acceleration of the coupling disk to the R.P.M. of the driving shaft renders it necessary to subject the disk to high axial stresses in order to keep it from slipping with respect to the driving shaft which, in turn, necessitates extremely rugged construction such as will add to the bulkiness of the clutch. On the other hand, if the coupling disk is permitted to slip, the wear on its surface and on the cooperating surface or surfaces of the driving shaft is so high that some or all friction linings must be replaced at frequent intervals. Furthermore, if the disk is free to slip at the time it is caused to move into engagement with the driving shaft, it takes quite some time to accelerate the driven shaft to the r.p.m. of the driving shaft which might be undesirable in many types of clutches which are intended to accelerate the driven shaft without noticeable delay.

A further serious drawback of clutches wherein the coupling disk is rigid with the driven shaft insofar as angular movements are concerned is that the disk will move radially with respect to the driving shaft whenever the driving shaft is not in exact coaxial alignment with the driven shaft. Such eccentricity of the coupling disk with respect to the driving shaft results in excessive wear on the disk, on the driving shaft, and on the bearings in which the driving and driven shafts are mounted.

Accordingly, it is an important object of my invention to provide an improved axial clutch which is constructed and assembled with a view to avoid the aforementioned drawbacks of all such axial clutches of which I have knowledge at this time, and to provide an improved braking device which cooperates with the coupling disk in a novel way.

Another object of the invention is to provide an improved axial clutch of the just outlined characteristics which is of very compact design, which is constructed and assembled in such a way that the wear on all friction linings and on all bearings is reduced to a minimum, that the wear on the coupling disk and on the cooperating driving and driven shafts is minimal even if the driving shaft is not in exact coaxial alignment with the driven shaft or vice versa, and that the inertia of the driving shaft and/or the driven shaft is reduced to a minimum because the braking device need not rotate with the driving shaft or with the driven shaft.

A concomitant object of the invention is to provide an improved motion transmitting assembly which connects the coupling disk with one of the cooperating shafts and which is constructed in such a way that it may perform the function of an overload clutch so as to protect the parts against breakage in response to excessive torque such as could cause damage to the driving shaft and/or the driven shaft.

Still another object of the invention is to provide an improved motion transmitting assembly of the just outlined characteristics which permits not only axial but also some angular movements of the coupling disk with respect to that shaft which is operatively connected thereto so that the disk may transmit motion without sudden shocks such as could damage or destroy the clutch or the devices which are connected with the shafts.

A further object of my invention is to provide a motion transmitting assembly of the above outlined characteristics which enables the coupling disk to actually float with respect to the driven shaft so that there is no possibility of excessive friction between the disk and the friction linings of the clutch.

An additional object of my invention is to provide an improved electromagnetic brake for a clutch which embodies a motion transmitting assembly of the just outlined characteristics, and to provide for such mounting of the brake that its current consuming parts remain stationary at all times so that the assembly may operate without slip rings or similar cost- and wear-increasing auxiliaries.

With the above objects in view, one feature of my invention resides in the provision of an axial clutch which comprises a rotary driving member including a rotor element which is coaxial therewith, a rotary driven member which is coaxial with the driving member and which comprises a portion adjacent to the rotor element, a fixed braking element preferably assuming the form of a cylindrical drum which surrounds the driven member and which is adjacent to but spaced from the rotor element, a coupling disk which is rotatably and axially movably mounted on the aforementioned portion of the driven member intermediate the two elements and which is normally in frictional engagement with one of these elements, resilient motion transmitting means connecting the disk with the driven member in such a way that the disk is free to move axially of but is compelled to rotate with the driven member in response to biasing of the motion transmitting means, and shifting means for moving the disk into frictional engagement with the other element so that the disk automatically rotates the driven member when it engages the rotor element and that the disk automatically arrests the driven member when it engages the breaking element.

In accordance with another feature of my invention, the motion transmitting means may assume the form of one or more leaf springs which are fixed to the driven member and whose outer ends are received between pairwise arranged pins secured to the coupling disk in such a way that the latter may move with the pins axially relative to the springs but may rotate the driven member by tending to bend the springs through the intermediary of the pins. Such arragement provides for some angular play between the disk and the driven member and, if necessary, also permits complete disengagement of the disk from the driven member so that the springs and pins actually constitute an overload clutch within the improved clutch.

The novel features which are considered as characteristic of the invention are set forth in particular in the appended claims. The improved clutch itself, however, both as to its construction and the method of assembling and operating the same, together with additional features and advantages thereof, will be best understood from the following detailed description of a specific embodiment with reference to the accompanying drawings, in which:

Figure 1:
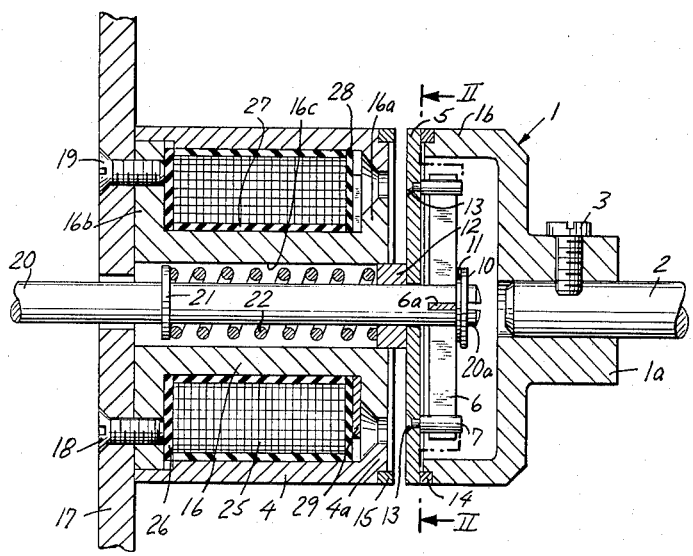
FIG. 1 is an axial section through a combination clutch and magnetic brake with the parts shown in operative position in which the driving member transmits motion to the driven member.
Figure 4:
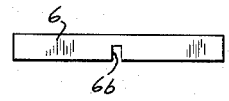
FIG. 4 is an elevational view of the retaining ring for the coil of a magnetic brake which cooperates with the clutch.

Referring now in greater detail to the illustrated embodiment, and first in FIG. 1, there is shown a clutch which is combined with a magnetic brake including a stationary braking element here shown as a cylindrical brake drum 4 which may arrest a rotary driven member 20 in order to avoid lengthy idling as soon as the driven member is disconnected from a driving member 2. The latter assumes the form of a shaft whose left-hand end portion is connected with the hub 1a of a cupper rotor element 1 by means of a radial screw 3 or the like. It will be understood that the rotor element 1 may constitute an integral part of the driving member. The internal chamber of the cylindrical portion 1b of the rotor element 1 accommodates the right-hand end portion 20a of the driven member 20 which latter assumes the form of a shaft and is coaxial with the shaft 2. The end portion 20a is slotted, as at 8 and 9 (see FIG. 2), to receive the median portions of two crossing motion transmitting members here shown as leaf springs 6, 6a whose planes are perpendicular to each other and pass through the common axis of the shafts 2, 20. FIG. 4 shows that the median portion of the spring 6 is formed with a recess or cutout 6b which extends inwardly from one of its edge faces and which accommodates a portion of the other spring 6a. This latter spring is formed with a similar recess so that the springs 6, 6a may be assembled in egg crate fashion to form a cruciform motion transmitting assembly. The springs 6, 6a are retained in the slots 9, 8 by a spring washer 11 which is held in position by a stop disk 10 fitted around the end portion 20a.

Figure 2:
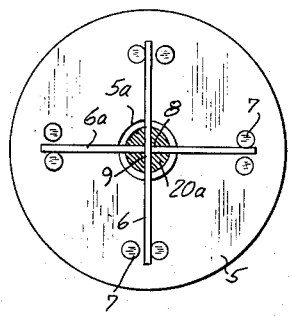
FIG. 2 is a transverse section as seen in the direction of arrows from the line II—II of FIG. 1.

The outer end portions of the springs 6, 6a are received between pairwise arranged projections here shown as pins 7 which are fixed to an annular coupling disk 5 and which extend into the internal chamber of the cylindrical portion 1b. The central opening 5a of this disk provides a passage for the driven shaft 20, and it will be noted that the diameter of the disk approximates or equals the diameter of the rotor element 1. The width of the gaps between the pairwise arranged pins 7 exceeds slightly the thickness of the springs 6, 6a so that the ends of these pins receive the respective springs with small play which is indicated in FIG. 2. It goes without saying that the pins 7 may be replaced by other types of projections, for example, by lugs which may be bent from the general plane of the disk 5, by U-shaped connecting members or the like. All that counts is that the connection between the springs 6, 6a and the coupling disk 5 be selected with a view to permit axial movements of the disk with respect to the driven shaft 20 or vice versa. Thus, it is possible to secure the pins 7 to the outer end portions of the springs 6, 6a and to provide for axial movement of such pins through suitable bores in the coupling disk 5. The arrangement which is actually shown in the drawings is normally preferred because the springs 6, 6a and the pins 7 together form a motion transmitting means which may serve as an overload clutch and which may permit complete disconnection of the disk 5 from the driven member 20 in response to excessive torque.

The disk 5 is under the bias of a helical coupling spring 22 which tends to maintain the right-hand side of the disk, as viewed in FIG. 1, in frictional engagement with an annular friction lining 14 which is recessed into the end face of the cylindrical portion 1b. When the spring 22 is permitted to expand, the shaft 2 drives the shaft 20 through the rotor element 1, through the disk 5, through the pins 7, and through the springs 6, 6a. As shown, the spring 22 operates between a stationary ring 21 which may assume the form of a split ring so as to be readily insertable into a circumferential groove of the driven shaft 20, and a ring-shaped washer 12 which is inserted between the rightmost convolution of this spring and the left-hand side of the disk 5. The washer 12 may consist of bronze, brass or a similar metallic material. The distance between the ring 21 and the springs 6, 6a is selected in such a way that the coupling spring 22 is under permanent compression and normally establishes a requisite frictional engagement between the right-hand side of the disk 5 and the lining 14.

The disk 5 consists of magnetizable material so that it may be moved axially of and away from the rotor 1 in response to energization of a coil 25 which forms part of a shifting means for the disk and which is accommodated in the brake drum 4. This drum is press-fitted around and is preferably welded or glued to the annular collar 16b of a cylindrical core 16 which is formed with an axial bore 16c for the washers 12, 21. The diameter of the bore 16c is somewhat greater than the diameters of the washers so that the latter may rotate in and that the washer 12 may move axially with respect to the core 16. The right-hand end portion 4a of the drum 4 assumes the form of an inwardly extending flange which constitutes one pole shoe of a brake magnet whose other pole shoe is formed by a radially outwardly extending annular flange 16a at the right-hand end of the core 16. The end face of the flange 4a is provided with an annular recess which accommodates a friction lining 15. The linings 15, 14 are bonded to their respective carriers 4a, 1a by means of a suitable adhesive and their outer diameters equal or approximate the diameter of the rotor element 1. It will be noted that the diameter of this rotor element equals or approximates the diameter of the brake drum 4. An important advantage of such mounting of the linings 14, 15 is that they may be readily cooled, if necessary, or that the friction heat is dissipated without artificial cooling.

Figure 3:
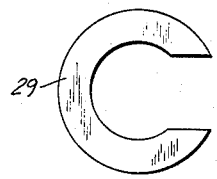
FIG. 3 is an elevational view of a motion transmitting spring which forms part of the structure shown in FIGS. 1 and 2.

A layer 27 of insulating material is provided between the coil 25 and the core 16. The end faces of this coil abut against a pair of insulating rings 26, 28 the latter of which is held against axial movement by a substantially U-shaped retaining washer 29 which is illustrated in FIG. 3. The washer 29 serves as an abutment at the time the coil 25 is being convoluted around the core 16.

The flange 16b at the left-hand end of the core 16 is secured to a stationary supporting member 17, for example, by means of screw bolts 18, 19. The member 17 may form part of a suitable housing in a vehicle or in another machine in which the clutch of my invention is put to use. It will be noted that the left-hand end portion of the brake drum 4 is formed with a countersunk annular recess which accommodates the peripheral portion of the flange 16b in such a way that the drum 4 is rigid with the core 16 and with the supporting member 17.

When the coil 25 is energized, a magnetic field is created between the pole shoes 4a, 16a and attracts the disk 5 against the bias of the spring 22 so that the disk shifts in a direction to the left, as viewed in FIG. 1, and engages the friction lining 15 whereby the shaft 20 is braked and comes to a rapid halt. As soon as the coil 25 is deenergized, the spring 22 is free to expand and returns the disk 5 to the position of FIG. 1, i.e., into frictional engagement with the lining 14 so that the shaft 20 receives motion through the springs 6, 6a and through the pins 7. In the illustrated embodiment, the pins 7 are secured to the disk 5 by rivets 13.

It will be readily understood that the magnet including the parts 16, 25 constitutes but one form of shifting means for disconnecting the disk 5 from the rotor element 1 since such axial movements of the disk may be brought about by other types of shifting means, for example, by providing the disk 5 with a shifter collar which cooperates with a conventional shifter lever in a manner well known in the art of axial clutches. Also the improved clutch may be used without any shifting means so that the coupling spring 22 is free to maintain the disk 5 in permanent frictional engagement with the lining 14. The advantages of the motion transmitting springs 6, 6a which cooperate with the pins 7 to connect the disk 5 with the driven shaft 2 are the same regardless of whether the clutch is combined with a magnetic shifting device which may simultaneously perform the function of a brake, with a mechanically operated shifting device, or whether the clutch is used without any shifting means.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended with the meaning and range of equivalence of the following claims.

What is claimed as new and desired to be secured by Letters Patent is:

1. An axial clutch and brake comprising a rotary driving shaft including a rotor element; a rotary driven member coaxial with said driving shaft and having a portion adjacent to said rotor element; a fixed braking element adjacent to but spaced from said rotor element; a coupling disk member rotatably and axially movably surrounding said portion of the driven member intermediate said elements and normally engaging with friction one of said elements; resilient motion transmitting means connecting said disk member with said driven member so that the disk member is free to move axially of said driven member but rotates said driven member in response to rotational movement imparted to said disk by said rotor element when said disk member and said rotor element are in engagement, said motion transmitting means comprising a leaf spring mounted on one of said members and engaging the other of said members slidably in radial and axial directions; and electromagnetic shifting means coaxial with and surrounding said rotary driven member for moving said disk member into frictional engagement with the other of said elements so that the disk member drives said driven member while engaging said rotor element and that the driven shaft is held against rotation when the disk member engages said braking element.

2. An axial clutch comprising a rotary driving element; a rotary driven member coaxial with said driving element and having a portion adjacent to said driving element; a coupling disk member rotatably and axially movably surrounding said portion of the driven member and normally engaging with friction said driving element; resilient motion transmitting means connecting said disk member with said driven member for rotating said driven member in response to rotational movement imparted to said disk member by said driving element when said disk member and said driving element are in engagement with each other, said motion transmitting means comprising a leaf spring mounted on one of said members and engaging the other of said members slidably in radial and axial directions; and electromagnetic shifting means coaxial with and surrounding said driven member for moving said disk member axially out of engagement with said driving element, said leaf spring being deformed only in response to relative rotational movement of said members with respect to each other while retaining its condition of stress in response to relative axial movement between said members.

3. An axial clutch comprising a rotary driving member including a rotor element; a rotary driven member coaxial with said driving member and having a portion adjacent to said rotor element; a coupling disk rotatably and axially movably surrounding said portion of the driven member; spring means permanently biasing said disk into frictional engagement with said rotor element so that the disk rotates in response to rotation of the driving member; resilient motion transmitting means fixed to said driven member and operatively connected with said disk so as to permit axial and limited angular movements of said disk with respect to said driven member, said motion transmitting means comprising a leaf spring having a central portion fixed to said driven member and a pair of end portions extending radially from said driven member, and a pair of projections for each of said end portions, each pair of projections being fixed to said disk and defining a gap for the respective end portion of the leaf spring so that the disk and the projections may move with respect to said leaf spring in the axial direction of said driven member while maintaining at least part of said end portion of said spring in said gap and without changing the bias of said spring, said projecting biasing the leaf spring and the latter transmitting rotation to said driven member when the disk engages said rotor element; and electromagnetic shifting means coaxial with and surrounding said driven member for moving said disk axially out of engagement with said driving member when desired.

4. An axial clutch and brake comprising a rotary driving shaft including a rotor element; a rotary driven shaft coaxial with said driving shaft and having a portion adjacent to said rotor element; a fixed brake drum adjacent to but spaced from said rotor element, said drum being coaxial with said rotor element and surrounding said driven shaft and being provided with an annular cavity coaxially surrounding said driven shaft; a coupling disk rotatably and axially movably surrounding said portion of the driven shaft intermediate said brake drum and said rotor element; a pair of annular friction linings respectively recessed into said rotor element and into said drum at the opposite sides of said disk; coupling spring means permanently biasing said disk into frictional engagement with the friction lining of said rotor element so that the disk rotates in response to rotation of said driving shaft; resilient motion transmitting means connecting said disk with said driven shaft, said resilient motion transmitting means including a leaf spring having a central portion fixed to the driven shaft and end portion engaging the coupling disk slidably in radial and axial directions so as to permit axial and limited angular movements of said disk with respect to said driven shaft; and electromagnetic shifting means arranged in said annular cavity for axially moving said disk into frictional engagement with the friction lining of said brake drum against the bias of said spring means so that the disk holds said driven shaft against rotation.

5. An axial clutch and brake comprising a rotary driving member including a rotor element; a rotary driven member coaxial with said driving member and having a portion adjacent to said rotor element; a fixed brake drum adjacent to but spaced from said rotor element, said drum being coaxial with said rotor element and surrounding said driven member; a coupling disk for magnetizable material rotatably and axially movably surrounding said portion of the driven member intermediate said brake drum and said rotor element; coupling spring means permanently biasing said disk into frictional engagement with said rotor element so that the disk rotates in response to rotation of said driving member; resilient motion transmitting means including a leaf spring having a central portion fixed to said driven member and end portions engaging said disk slidably in radial and axial directions so as to permit axial and limited angular movements of said disk with respect to said driven member; and shifting means for selectively moving said disk into frictional engagement with said brake drum against the bias of said spring means so that the disk holds said driven member against rotation, said shifting means comprising an electromagnet provided in said brake drum and surrounding said driven member.

6. A clutch and brake as set forth in claim 5, wherein said electromagnet comprises a cylindrical core coaxially received in said brake drum and surrounding said driven member, and a coil surrounding said core.

7. An axial clutch and brake comprising a rotary driving member including a rotor element; a rotary driven member coaxial with said driving member and having a portion adjacent to said rotor element; a fixed brake drum comprising an annular portion of magnetizable material adjacent to but spaced from said rotor element, said drum surrounding said driven member; a coupling disk of magnetizable material rotatably and axially movably surrounding said portion of the driven member and located intermediate said brake drum and said rotor element; coupling spring means permanently biasing said disk into frictional engagement with said rotor element so that the disk rotates in response to rotation of said driving member; resilient motion transmitting means including a leaf spring having a central portion supported by said driven member and end portions engaging said disk slidably in radial and axial directions so as to permit at least some axial and limited angular movements of said disk with respect to said driven member; and electromagnetic shifting means for selectively moving said disk into frictional engagement with said brake drum against the bias of said spring means so that the disk holds said driven member against rotation, said shifting means comprising a tubular core of magnetizable material surrounding said driven member and having an annular portion disposed within the magnetizable portion of said brake drum so that said magnetizable portions form a pair of pole shoes, and a coil disposed between said brake drum and said core.

8. A clutch and brake as set forth in claim 7, wherein said coupling spring means is a helical spring which surrounds said driven member and is accommodated in said core.

9. A clutch and brake as set forth in claim 7, wherein said core comprises an outwardly extending annular flange at that end thereof which is distant from said magnetizable portions, and wherein said flange is received in and is secured to said brake drum.

10. An axial clutch and brake comprising a rotary driving member including a rotor element; a rotary driven member coaxial with said driving member and having a portion adjacent to said rotor element; a fixed cylindrical brake drum comprising an annular portion of magnetizable material adjacent to but spaced from said rotor element, said drum coaxially surrounding said driven member; a coupling disk of magnetizable material rotatably and axially movably surrounding said portion of the driven member and located intermediate said brake drum and said rotor element; coupling spring means permanently biasing said disk into frictional engagement with said rotor element so that the disk rotates in response to rotation of said driving member; resilient motion transmitting means including a leaf spring having a central portion supported by said driven member and end portions engaging said disk slidably in radial and axial directions so as to permit at least some axial and limited angular movements of said disk with respect to said driven member; and electromagnetic shifting means for selectively moving said disk into frictional engagement with said brake drum against the bias of said spring means so that the disk holds said driven member against rotation, said shifting means comprising a cylindrical core of magnetizable material surrounding said driven member and having an annular portion disposed within the magnetizable portion of said brake drum so that said magnetizable portions form a pair of pole shoes, said core being received in and being coaxial with said brake drum, and a cylindrical coil disposed between said brake drum and said core.

References Cited by the Examiner

UNITED STATES PATENTS

| | | |
|---|---|---|
| 1,455,425 | 5/23 | Brown. |
| 1,952,232 | 3/34 | Axien _____ 192—55 |
| 2,455,900 | 12/48 | Yardeny et al. _____ 192—14 |
| 2,591,989 | 4/52 | Winther _____ 192—90 |
| 2,597,685 | 5/52 | Turner _____ 192—14 |
| 2,845,820 | 8/58 | Brown et al. |
| 2,965,203 | 12/60 | White. |
| 3,016,118 | 1/62 | Zatsky. |

DAVID J. WILLIAMOWSKY, *Primary Examiner.*